United States Patent [19]

Ammirato et al.

[11] Patent Number: 5,499,180
[45] Date of Patent: Mar. 12, 1996

[54] SYSTEM AND METHODS FOR IMPROVED SCENARIO MANAGEMENT IN AN ELECTRONIC SPREADSHEET

[75] Inventors: Joseph M. Ammirato, San Jose; Gavin Peacock, Capitola, both of Calif.

[73] Assignee: Borland International, Inc., Scotts Valley, Calif.

[21] Appl. No.: 165,237

[22] Filed: Dec. 10, 1993

Related U.S. Application Data

[63] Continuation of Ser. No. 31,379, Mar. 11, 1993, Pat. No. 5,303,146.

[51] Int. Cl.⁶ .......................... G06F 15/00; G09B 5/00; G09C 1/00; H01J 31/00
[52] U.S. Cl. .................. 364/419.1; 395/145; 395/146; 395/148; 364/406
[58] Field of Search .................................. 364/400, 401, 364/403, 402, 419.1; 395/600, 155, 160, 161, 144, 145, 146, 147, 148, 149

[56] References Cited

U.S. PATENT DOCUMENTS

| | | | |
|---|---|---|---|
| 4,020,466 | 4/1977 | Cordi et al. | 395/600 |
| 4,077,059 | 2/1978 | Cordi et al. | 395/600 |
| 4,819,156 | 4/1989 | DeLorme et al. | 395/575 |
| 5,021,973 | 6/1991 | Hernandez et al. | 364/518 |
| 5,033,009 | 7/1991 | Dubnoff | 364/523 |
| 5,055,998 | 10/1991 | Wright et al. | 364/200 |
| 5,093,907 | 3/1992 | Hwong et al. | 395/152 |
| 5,095,429 | 3/1992 | Harris et al. | 364/401 |
| 5,121,499 | 6/1992 | McCaskill et al. | 395/700 |
| 5,182,793 | 1/1993 | Alexander et al. | 395/13 |
| 5,214,780 | 5/1993 | Ingoglia et al. | 395/600 |
| 5,231,577 | 7/1993 | Koss | 364/419 |
| 5,237,500 | 8/1993 | Perg et al. | 364/408 |
| 5,255,356 | 10/1993 | Michelman et al. | 395/148 |
| 5,276,607 | 1/1994 | Harris et al. | 364/401 |
| 5,293,615 | 3/1994 | Amada | 395/600 |
| 5,303,146 | 4/1994 | Ammirato et al. | 364/401 |
| 5,371,675 | 12/1994 | Greif et al. | |
| 5,416,895 | 5/1995 | Anderson et al. | 395/148 |

FOREIGN PATENT DOCUMENTS

| | | | |
|---|---|---|---|
| 0527622A2 | 2/1993 | European Pat. Off. | |
| 4324540 | 11/1992 | Japan | G06F 12/00 |

OTHER PUBLICATIONS

Rosenberg; *Dictionary of Computers, Information Processing, and Telecommunications*, 2nd edition; 1984, 1987.

West et al., "A Spreadsheet with Visible Logic," *ICL Technical Journal* (1990) 7:319:327.

"Automatically Synchronized Objects," *Research Disclosure*, vol. 292, No. 61, Aug. 1988, p. 614, disclosed anonymously.

"HAL," *Which Computer?*, Jan. 1987, pp. 53–56, author unknown.

Douglas Cobb et al., published by Microsoft Press, "Excel, Second Edition," Mac Version, pp. 326–337.

"User's Guide 2, Worksheet Analysis, Exchanging Data, Customizing, Automating," Microsoft Excel, pp. 67–74.

*Primary Examiner*—Donald E. McElheny, Jr.
*Assistant Examiner*—Stephen R. Tkacs
*Attorney, Agent, or Firm*—Townsend and Townsend and Crew

[57] ABSTRACT

An electronic spreadsheet of the present invention includes a scenario manager having a preferred interface and methods for creating and managing various versions or "scenarios" of a spreadsheet model. Methods are provided for specifying an area of the model to track (capture area) and capturing various versions (modifications) of the base model. Additional methods are provided for automatically identifying and reporting information cells which are affected ("changing" and "result" cells) from version to version. Preferred storage methodology is also described for maintaining multiple versions of a spreadsheet or data model.

32 Claims, 14 Drawing Sheets

SYSTEM AND METHODS FOR IMPROVED SCENARIO MANAGEMENT IN AN ELECTRONIC SPREADSHEET

This is a continuation of application Ser. No. 08/031,379 filed Mar. 11, 1993, U.S. Pat. No. 5,303,146.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the field of information processing by digital computers and, more particularly, to the processing and presentation of information by electronic spreadsheets.

Before computers, numerical analyses, particularly financial ones, were usually prepared on an accountant's columnar pad or spreadsheet, with pencil and calculator in hand. By organizing data into columns and rows, spreadsheets afford the rapid assimilation of information by a reader. The task of preparing a spreadsheet on paper, however, is not quite so fast. Instead, the process tends to be very slow, as each entry must be tediously calculated and entered into the spreadsheet. Since all calculations are the responsibility of the preparer, manually prepared spreadsheets are also prone to errors. Hence, preparation of spreadsheets by hand is slow, tedious, and unreliable.

With the advent of microcomputers, a solution was forthcoming in the form of "electronic spreadsheets." Better known simply as "spreadsheets," these software programs provide a computerized replacement for the traditional financial modeling tools: the accountant's columnar pad, pencil, and calculator. In some regards, spreadsheet programs are to those tools what wordprocessors are to typewriters. Spreadsheets offer dramatic improvements in ease of creating, editing, and using financial models.

A typical spreadsheet program configures the memory of a computer to resemble the column/row or grid format of an accountant's columnar pad, thus providing a visible calculator for a user. Because this "pad" exists dynamically in the computer's memory, however, it differs from paper pads in several important ways. Locations in the electronic spreadsheet, for example, must be communicated to the computer in a format which it can understand. A common scheme for accomplishing this is to assign a number to each row in a spreadsheet, and a letter to each column. To reference a location at column A and row 1 (i.e., the upper-lefthand corner), for example, the user types in "A1". In this manner, the spreadsheet defines an addressable storage location or "cell" at each intersection of a row with a column.

Data entry into an electronic spreadsheet occurs in much the same manner that information would be entered on an accountant's pad. After a screen cursor is positioned at a desired location, the user can enter alphanumeric information. Besides holding text and numeric information, however, spreadsheet cells can store special instructions or "formulas" specifying calculations to be performed on the numbers stored in spreadsheet cells. In this fashion, cell references can serve as variables in an equation, thereby allowing precise mathematical relationships to be defined between cells. The structure and operation of a spreadsheet program, including advanced functions such as functions and macros, are documented in the technical, trade, and patent literature. For an overview, see e.g., Cobb, S., *Using Quattro Pro* 2, Borland-Osborne/McGraw-Hill, 1990; and LeBlond, G. and Cobb, D., *Using* 1-2-3, Que corp., 1985. The disclosures of each of the foregoing are hereby incorporated by reference.

Electronic spreadsheets offer many advantages over their paper counterparts. For one, electronic spreadsheets are much larger (i.e., hold more information) than their paper counterparts; electronic spreadsheets having thousands or even millions of cells are not uncommon. Spreadsheet programs also allow users to perform "what-if" scenarios. After a set of computational relationships has been entered into a worksheet, the spread of information can be recalculated using different sets of assumptions, with the results of each recalculation appearing almost instantaneously. Performing this operation manually, with paper and pencil, would require recalculating every relationship in the model with each change made. Thus, electronic spreadsheet systems were invented to solve "whatif" problems, that is, changing an input and seeing what happens to an output.

More recent implementations of these systems have added "solvers" or "optimizers." This adds goal-seeking functionality where a user can reverse the what-if process— deciding what value one wants an output to assume, with the system determining the appropriate input value(s). In a typical implementation, the user can set a target value at one cell, then specify both multiple input variables and multiple constraint cells. The optimizer finds all combinations of input values that achieve the target output without violating the constraints. Typically, a user employs such an optimizer to maximize or minimize an output cell (rather than aiming for a specific target value).

These backsolvers and optimizers are a good first step at improving the what-if process. To date, however, electronic spreadsheet systems have not been particularly adept at the process of actually managing the multitude of what-if scenarios, that is, multiple variations spawn from a single model. Since a given spreadsheet model is routinely created under a set of assumptions (e.g., level of sales, corporate tax rate, and the like), it is desirable to test the extremes of one's assumptions to ascertain the likely results. Although such "best case/worst case" analyses are commonly required by users, present-day systems have provided little or no tools for creating and managing such a multitude of scenarios. Instead, the user must resort to manually creating separate copies of the underlying model, with the user responsible for tracking any modifications made in the various copies. As this approach is undesirable at best, there is a great need for a better solution.

SUMMARY OF THE INVENTION

The present invention comprises an electronic spreadsheet system having a preferred interface and methods for creating and tracking various versions or "scenarios" of a data model. The system includes tools for specifying a "capture area," that is a specific set of information cells to be tracked and an Identify Scenario tool for automatically determining changes between a captured parent or baseline model and a new scenario. Screen feedback techniques are provided for highlighting "changing cells" and "result cells" identified by the system.

In an exemplary method of the present invention, the user first specifies a capture area (such as notebook, page, or block) and a baseline (i.e., the base or standard case which is to serve as a reference). Next, the user proceeds to modify the worksheet, for example, changing the various assumptions (e.g., tax rate) employed to create the model. At the conclusion of the user-specified changes, the system locates any differences in non-formula cells when compared against corresponding ones in the baseline; these cells are "changing cells." Furthermore, the system determines any formula cells which express a different value as a result of changes in the changing cells. These cells, which may directly or indirectly reference one or more changing cells, are "result cells." After identifying these changing and result cells, the system may demonstrate them to the user (e.g., employing color highlights or the like).

The user may proceed to create a plurality of such scenarios, by simply repeating the foregoing process; each scenario so added is typically given a descriptive name by the user. For convenience, the system provides the user facilities for creating various groupings of scenarios; like each scenario, each group may be given an easy-to-remember descriptive name by the user. Individual scenarios may be added or deleted from one or more groups as desired. After creating desired scenarios, the user may instruct the system to save these new versions, together with the baseline, on a storage device. In a preferred embodiment, the new versions are stored together with the baseline, so that redundant information between the baseline and a particular version is not duplicated. A preferred method of the present invention for "versioning" (i.e., tracking and storing various versions of a base model) employs difference or delta records for recording the various changes which result with each new version.

BRIEF DESCRIPTION OF THE DRAWINGS

FIGS. 4A, 4B, 4C and 4D are bitmap screenshots illustrating creation of various versions or scenarios of the spreadsheet model of FIG. 3A.

DETAILED DESCRIPTION OF A PREFERRED EMBODIMENT

System Hardware

Figure 1A:
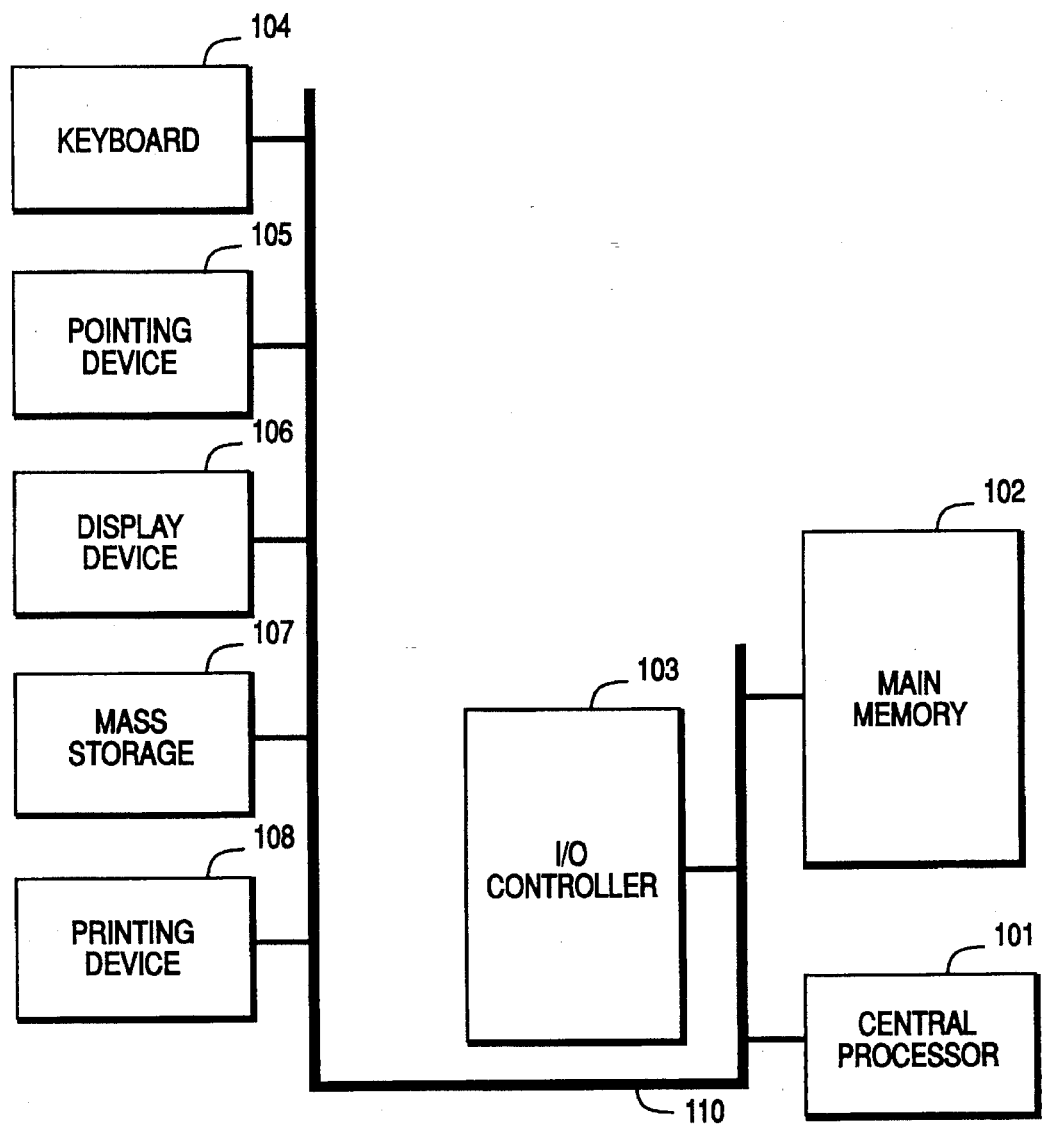
FIG. 1A is a block diagram of a computer system in which the present invention may be embodied.

As shown in FIG. 1A, the present invention may be embodied on a computer system such as the system 100, which comprises a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In a preferred embodiment, the computer system 100 includes an IBM-compatible personal computer, which is available from several vendors (including IBM of Armonk, N.Y.).

Figure 1B:
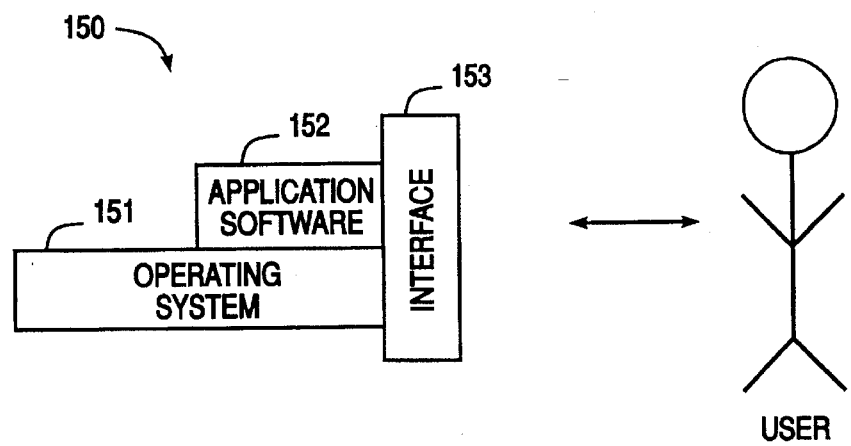
FIG. 1B is a block diagram of a software system of the present invention, which includes operating system, application software, and user interface components.

Illustrated in FIG. 1B, a computer software system 150 is provided for directing the operation of the computer system 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the system 100. The system 100 receives user commands and data through user interface 153; these inputs may then be acted upon by the system 100 in accordance with instructions from operating module 151 and/or application module 152. The interface 153, which is preferably a graphical user interface (GUI), also serves to display results, whereupon the user may supply additional inputs or terminate the session. In a preferred embodiment, operating system 151 is MS-DOS, and interface 153 is Microsoft® Windows; both are available from Microsoft Corporation of Redmond, Wash. Application module 152, on the other hand, includes a spreadsheet notebook of the present invention (as described in further detail hereinbelow).

Interface:

A. Introduction

The following description will focus on the presently preferred embodiments of the present invention, which are embodied in spreadsheet applications operative in the Microsoft Windows environment. The present invention, however, is not limited to any particular application or any particular environment. Instead, those skilled in the art will find that the system and methods of the present invention may be advantageously applied to a variety of system and application software, including database management systems, wordprocessors, and the like. Moreover, the present invention may be embodied on a variety of different platforms, including Macintosh, UNIX, NextStep, and the like. Therefore, the description of the exemplary embodiments which follows is for purposes of illustration and not limitation.

Figure 1C:
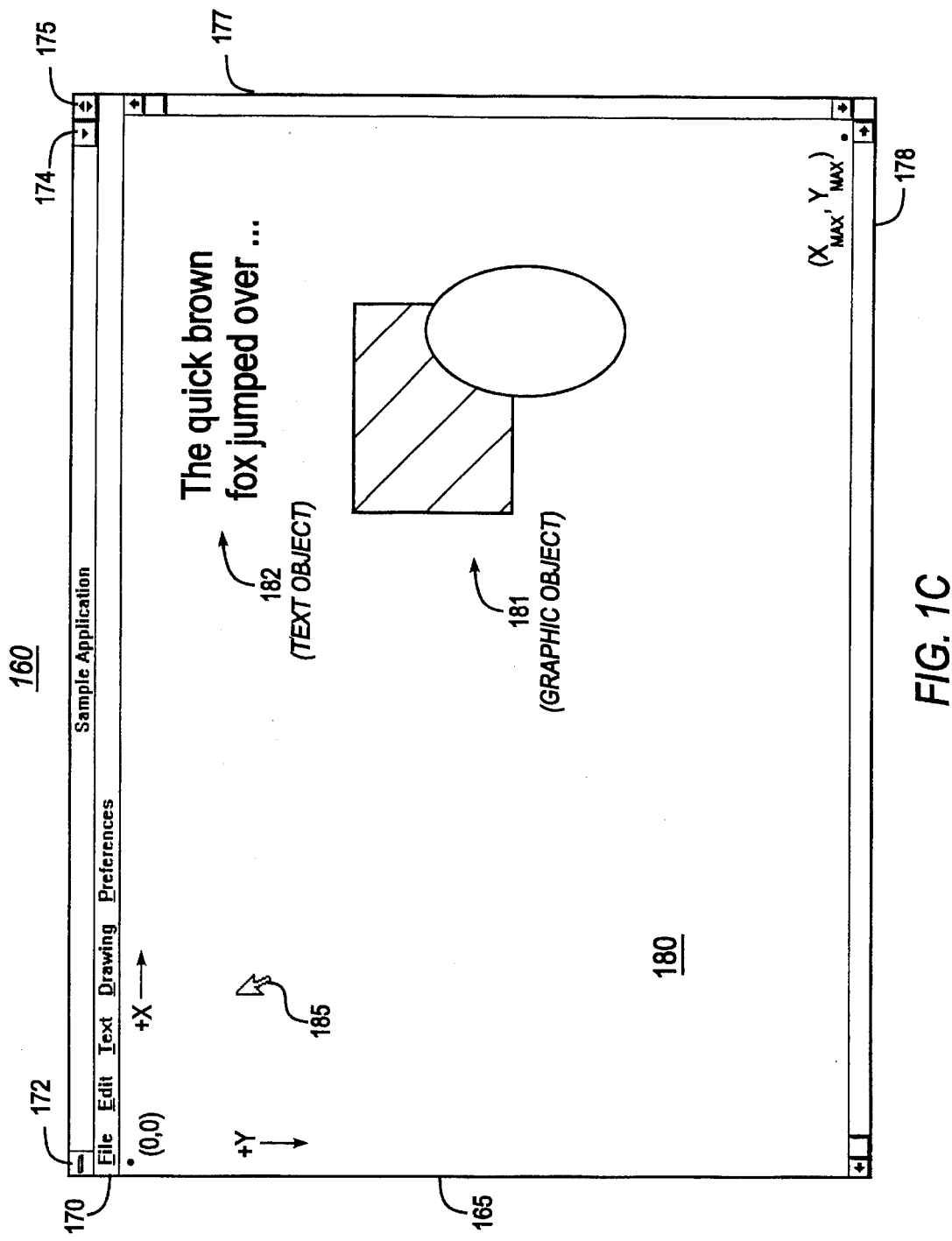
FIG. 1C is bitmap screenshots illustrating the basic architecture and functionality of a graphical user interface in which the present invention may be embodied.

Referring now to FIG. 1C, the system 100 includes a windowing interface or workspace 160. Window 160 is a rectangular, graphical user interface (GUI) for display on screen 106; additional windowing elements may be displayed in various sizes and formats (e.g., tiled or cascaded), as desired. At the top of window 160 is a menu bar 170 with a plurality of user-command choices, each of which may invoke additional submenus and software tools for use with application objects. Window 160 includes a client area 180 for displaying and manipulating screen objects, such as graphic object 181 and text object 182. In essence, the client area is a workspace or viewport for the user to interact with data objects which reside within the computer system 100.

Windowing interface 160 includes a screen cursor or pointer 185 for selecting and otherwise invoking screen objects of interest. In response to user movement signals from the pointing device 105, the cursor 185 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 160 may be closed, resized, or scrolled by "clicking" (selecting) screen components 172, 174/5, and 177/8, respectively.

In a preferred embodiment, screen cursor 185 is controlled with a mouse device. Single-button, double-button, or triple-button mouse devices are available from a variety of vendors, including Apple Computer of Cupertino, Calif., Microsoft Corporation of Redmond, Wash., and Logitech Corporation of Fremont, Calif., respectively. More preferably, screen cursor control device 105 is a two-button mouse device, including both right and left "mouse buttons."

Programming techniques and operations for mouse devices are well documented in the programming and hardware literature; see e.g., *Microsoft Mouse Programmer's Reference,* Microsoft Press, 1989. The general construction and operation of a GUI event-driven system, such as Windows, is also known in the art; see, e.g., Petzold, C., *Programming Windows,* Second Edition, Microsoft Press, 1990. The disclosures of each are hereby incorporated by reference.

B. Preferred interface

Figure 2A:
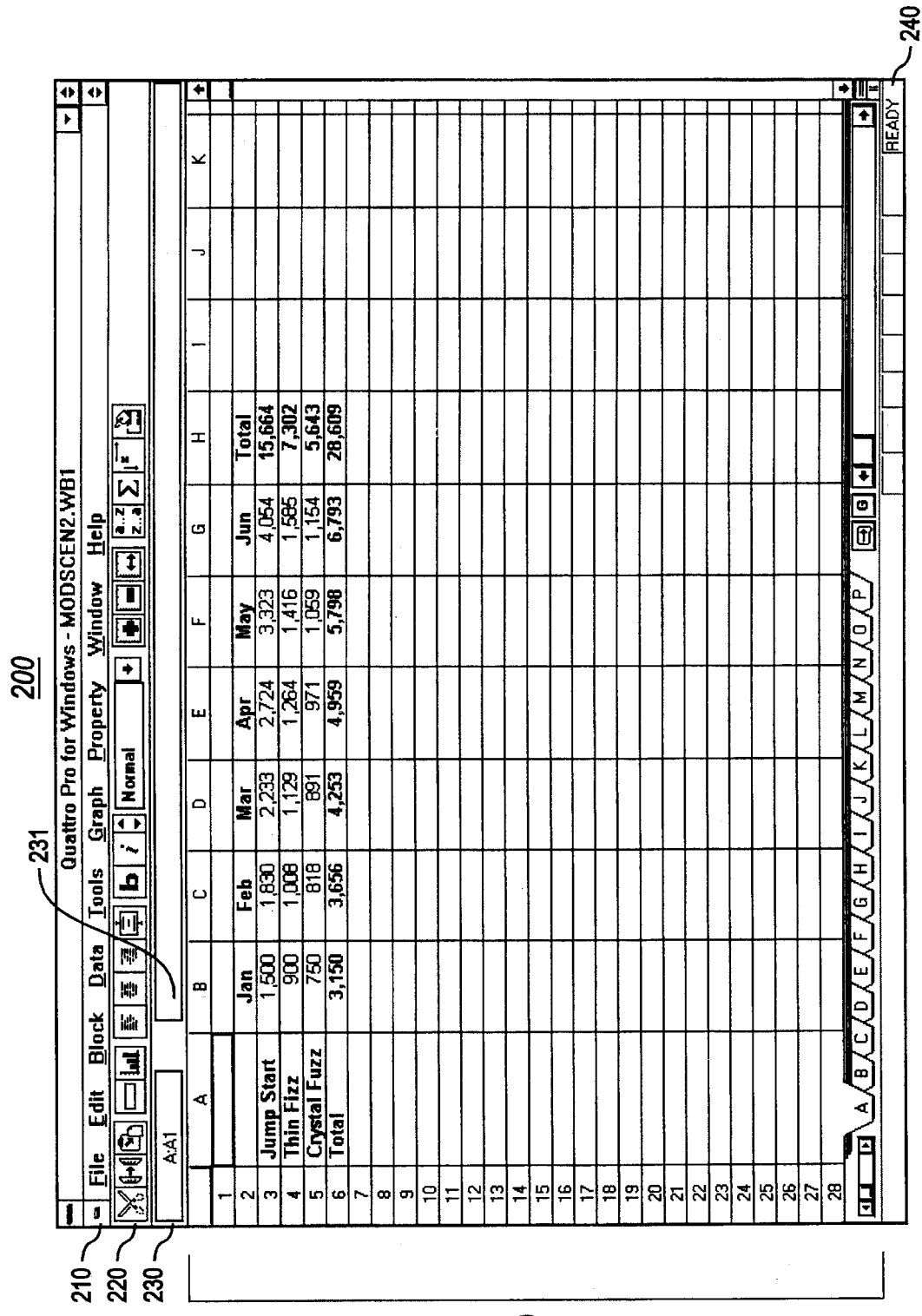
FIG. 2A is a screen bitmap illustrating a spreadsheet notebook interface employed in a preferred embodiment of the present invention.

Shown in FIG. 2A, a spreadsheet notebook interface of the present invention will now be described. The spreadsheet notebook or workbook of the present invention includes a notebook workspace 200 for receiving, processing, and presenting information, including alphanumeric as well as graphic information. Notebook workspace 200 includes a menu bar 210, a toolbar 220, a current cell indicator 230, an input line 231, a status line 240, and a notebook window 250. The menu bar 210 displays and invokes, in response to user inputs, a main level of user commands. Menu 210 also invokes additional pulldown menus, as is known in windowing applications. Input line 231 accepts user commands and information for the entry and editing of cell contents, which may include data, formulas, macros, and the like. Indicator 230 displays an address for the current cursor (i.e., active cell) position. At the status line 240, system 100 displays information about the current state of the workbook; for example, a "READY" indicator means that the system is ready for the user to select another task to be performed.

Figure 2B:
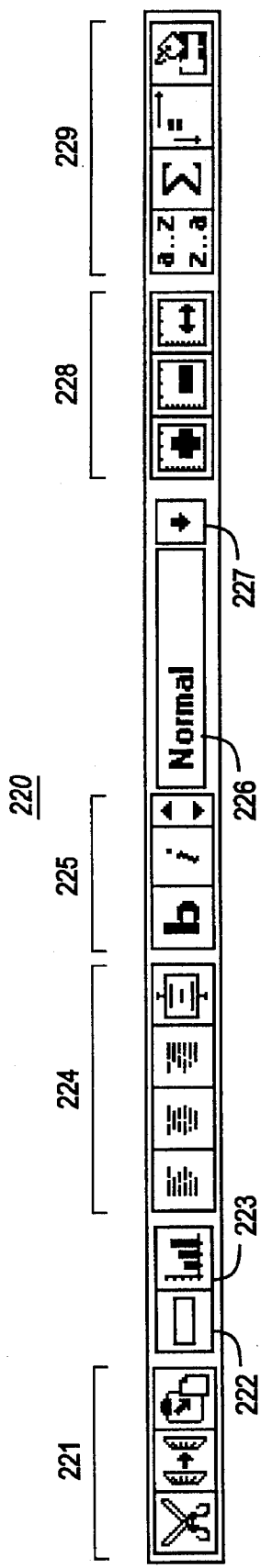
FIG. 2B is a bitmap of a toolbar component of the interface of FIG. 2A.

The toolbar 220, shown in further detail in FIG. 2B, comprises a row or palette of tools which provide a quick way for the user to choose commonly-used menu commands or properties. In an exemplary embodiment, toolbar 220 includes cut, copy, and paste buttons 221, a power button tool 222, a graph tool 223, alignment buttons 224, font buttons 225, a style list 226 with pulldown 227, insert/delete and fit buttons 227, and action (e.g., sort, sum, and the like) buttons 229. The functions of these buttons are suggested by their names. For instance, buttons 221 cut, copy and paste data and objects to and from Windows' clipboard. The same actions are also available as corresponding commands in the Edit menu (available from menu bar 210). Tool 220 creates "powerbuttons" which allow a user to run spreadsheet macros; in a specific embodiment, powerbuttons appear as floating objects in a layer above spreadsheet cells. In a similar fashion, the graph tool 223 creates floating graphs that appear above spreadsheet cells.

The notebook, which provides an interface for entering and displaying information of interest, includes a plurality of spreadsheet pages. Each page may include conventional windowing features and operations, such as moving, resizing, and deleting. In a preferred embodiment, the notebook includes 256 spreadsheet pages and one Graphs page, all of which are saved as a single disk file on the mass storage 107. Workspace 200 may display one or more notebooks, each sized and positioned (e.g., tiled, overlapping, and the like) according to user-specified constraints.

Each spreadsheet page of a notebook includes a 2-D spread. Page A from the notebook 200, for example, includes a grid in row and column format, such as row 3 and column F. At each row/column intersection, a box or cell (e.g., cell C4) is provided for entering, processing, and displaying information in a conventional manner. Each cell is addressable, with a selector being provided for indicating a currently active one (i.e., the cell that is currently selected).

Figure 2C:
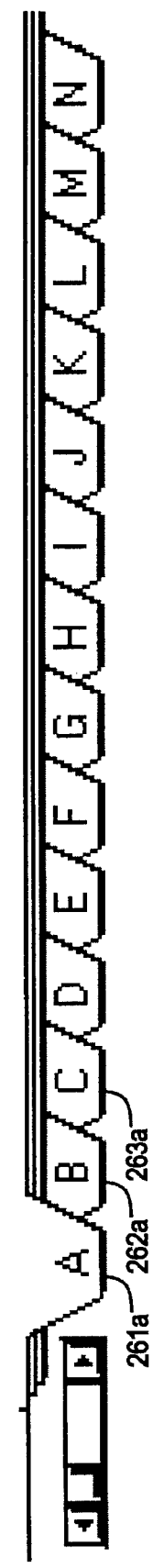
FIG. 2C and 2D are bitmaps illustrating page identifiers for rapidly accessing and manipulating individual pages of the notebook interface.
Figure 2D:
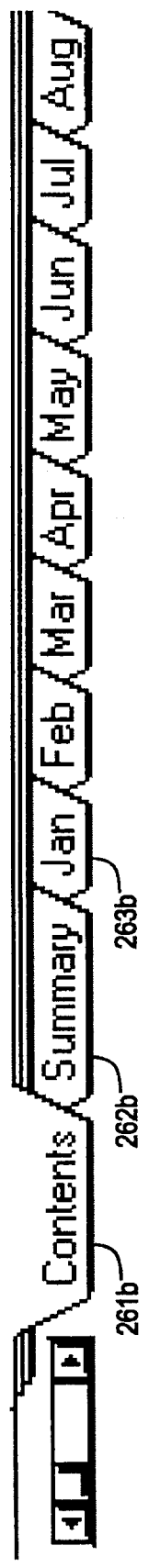

As shown in FIGS. 2C–D, individual notebook pages are identified by page identifiers 260, preferably located along one edge of a notebook. In a preferred embodiment, each page identifier is in the form of a tab member (e.g., members 261*a*, 262*a*, 263*a*) situated along a bottom edge of the notebook. Each tab member may include representative indicia, such as textual or graphic labels, including user-selected titles representing the contents of a corresponding page. In FIG. 2C, the tab members 260 are set to their respective default names. For example, the first three tab members (members 261*a*, 262*a*, 263*a*) are respectively set to A, B, and C. Tab members are typically given descriptive names provided by the user, however. As shown in FIG. 2D, for example, the first three tab members have now been set to "Contents" (tab member 261*b*), "Summary" (tab member 262b), and "Jan" (tab member 263*b*). In a similar manner, the remaining tabs are set to subsequent months of the year. In this manner, the user associates the page identifiers with familiar tabs from an ordinary paper notebook. Thus, the user already knows how to select a page or spread of interest: simply select the tab corresponding to the page (as one would do when selecting a page from a paper notebook).

In addition to aiding in the selection of an appropriate page of information, the user-customizable page identifiers serve aid in the entry of spreadsheet formulas. For example, when entering a formula referring to cells on another page, the user may simply use the descriptive page name in the formula itself (as described hereinbelow), thus making it easier for the user to understand the relationship of the cell(s) or information being referenced.

A general description of the features and operation of the spreadsheet notebook interface may be found in Quattro® Pro for Windows (*Getting Started, User's Guide* and *Building Spreadsheet Applications*), available from Borland International; additional description may be found in U.S patent application Ser. No. 07/866,658, commonly owned by the present assignee.

Model analysis: Scenario Management

A. Introduction

As the future for any given company is never entirely certain, it is helpful to lay out alternative combinations of certain unknown values side by side or sheet by sheet, so that one can see the range of possible outcomes at a glance. Of particular interest to the present invention is this problem of scenario modeling, that is, managing "best case, worst case" what-if problems. Scenarios are a form of model analysis where a user can create various models, by changing data in a base model and seeing how the changes affect formulas based on them.

One approach to this has been the scenario manager add-in found in Microsoft® Excel. Excel allows the user to designate a specific set of "uncertain" cells in a model, then assign combinations of values to each uncertain cell. Each combination of values becomes a particular scenario. The user then instructs the manager which outputs he or she is interested in; the system, in turn, builds a table showing the impact of each named scenario on each designated output cell.

The system 100 includes a number of tools for making projections or optimizing results based on models defined by the user. For instance, the system includes a "model copy" feature (described in assignee's application, U.S. Ser. No. 07/866,658) which simplifies the task of reproducing a framework of formulas on multiple pages of a notebook. Normally, when one copies formulas from one page to another, relative references are updated and absolute references are left unchanged. With model copy, the absolute references to cells on the current page are updated on the target pages. Using model copy, for instance, if one copied the formula BestCase:A1 from a page named BestCase to a page named WorstCase, the formula becomes WorstCase:A1 at the new location.

Thus, a "Model Copy" option of Block: Copy lets a user copy models to different locations in a notebook without affecting formula references. Then the user can change values in each copy to produce different scenarios. That method of scenario management is most suitable when one wants to build a set of scenarios for further analysis (e.g., Solve-for tools). One can place each scenario on a separate page labeled with a unique name, perform a variety of analyses, and print the results whenever desired.

B. Improved Scenario Manager

In contrast to just-described manual tools, the present invention provides a more powerful and interactive approach to scenario analysis in the form of a Scenario Manager. The manager automatically tracks value changes as one enters new data sets, with the added ability to allow a user at any time to name and save scenario variations in report form.

In general operation, the user decides how much of the notebook (e.g., a block, a page, or an entire notebook) to include in his or her scenario category. Within this "capture area," the user decides which information is to change (i.e., specifies "changing cells") with each desired scenario. This may be indicated to the system implicitly or explicitly. In the former, the user simply changes values within the included or capture area and the Scenario Manager automatically tracks all such changes; in the latter instance, the user explicitly identifies certain cells to be changing cells. In addition to changing cells, there are "result cells"—the cells which are affected by changes in the changing cells. The system automatically locates these result cells by determining among formula cells which one(s) express a value which differs from corresponding ones in the base scenario. A formula cell may change as a result of a direct or indirect reference to a changing cell; thus, a result cell need not be "dependent" on a changing cell, as that term is normally understood in spreadsheet parlance. Since changing and result cells typically express information (e.g., values) which are of immediate interest to the user, they are highlighted upon identification.

2. Tools

Figure 3A:
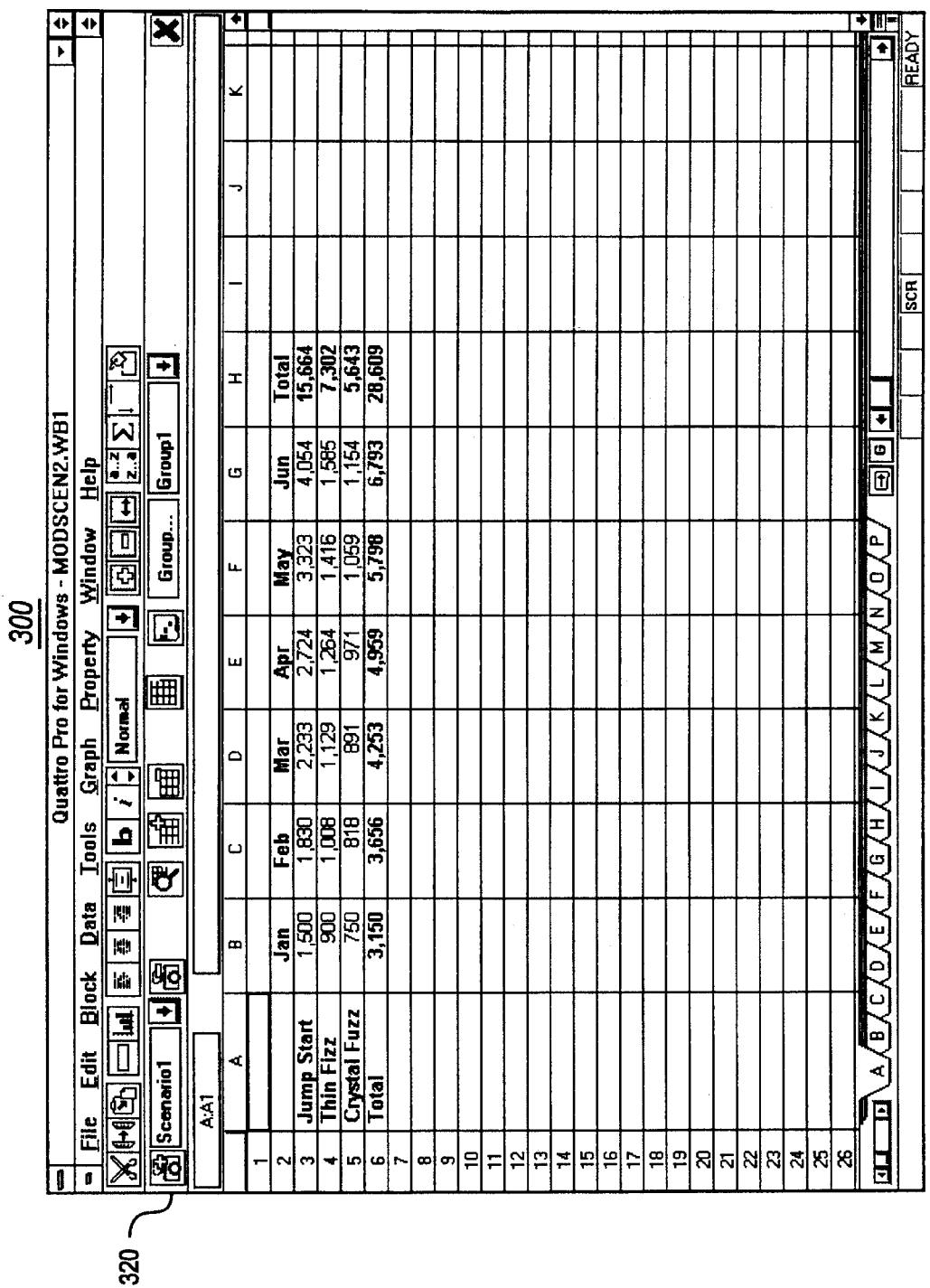
FIG. 3A is a bitmap screenshot illustrating a scenario management interface of the present invention; a sample model (worksheet), which is to serve as a base case, has been loaded into the system.
Figure 3B:
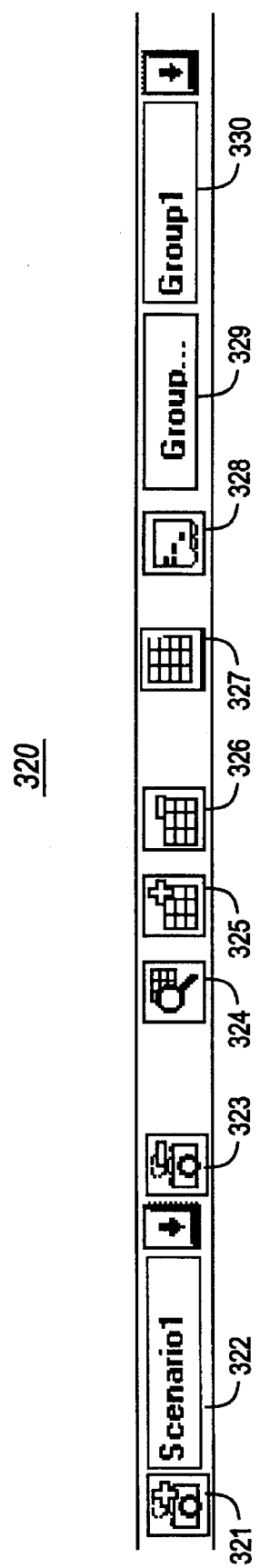
FIG. 3B is a bitmap of a toolbar component of the interface of FIG. 3A.

Referring now to FIG. 3A, these concepts will be illustrated. The figure shows a spreadsheet notebook 300 displaying a first page (page A) 310. The page or spread 310 includes a hypothetical model for monthly sales of a beverage company. Upon invocation of a Scenario Manager command (Tools: Scenario Manager from the main menu), the system displays a Scenario Manager toolbar 320, which includes preferred tools of the present invention for effecting scenario management. Each will be introduced in turn.

Capture Scenario button 321 may be thought of as a camera for taking a snapshot of the current data. Scenario Name list box 322 lists all available scenarios (which have been captured). Delete Scenario button 323 allows one to remove a scenario from the current list of active scenarios (as displayed in the list box 322). Identify Scenario button 324 captures the current scenario data; by clicking the Add Scenario button 321, one may associate this snapshot with a particular scenario name. Changing Cells button 325 serves to include selected "change cells" in the scenario; these change cells, in turn, will be included in the scenario page (report described hereinbelow). Remove Changing Cells button 326 excludes selected change cells from the scenario; these are, in turn, removed from the scenario page. Highlight Scenario cells button 327 toggles or turns change and result cell highlighting on and off; by default, change cells appear in yellow, and result cells appear in green. Report button 328 displays a "scenario page" having a Scenario Summary Report. The button serves as a toggle: the user may click the button again to return to the page he or she is working on. Scenario Group button 329 allows the user to divide a set of scenarios into subgroups or subsets, each subgroup representing a more specific scenario being modeled. Scenario category list box 330 lists the available groups or categories of scenarios (which were created with the Scenario Group button 329). To close the Scenario toolbar, the user clicks a Control button (shown as an X in FIG. 3A).

3. Scenario Management session

In general, scenario management is effected by employing Scenario Manager tools for creating and displaying various versions or scenarios. Upon creation of a desired scenario, the user may instruct the system to produce summary reports. With reference to FIGS. 4A–F, an exemplary session will be described in detail.

(a) Capture area

Figure 4A:
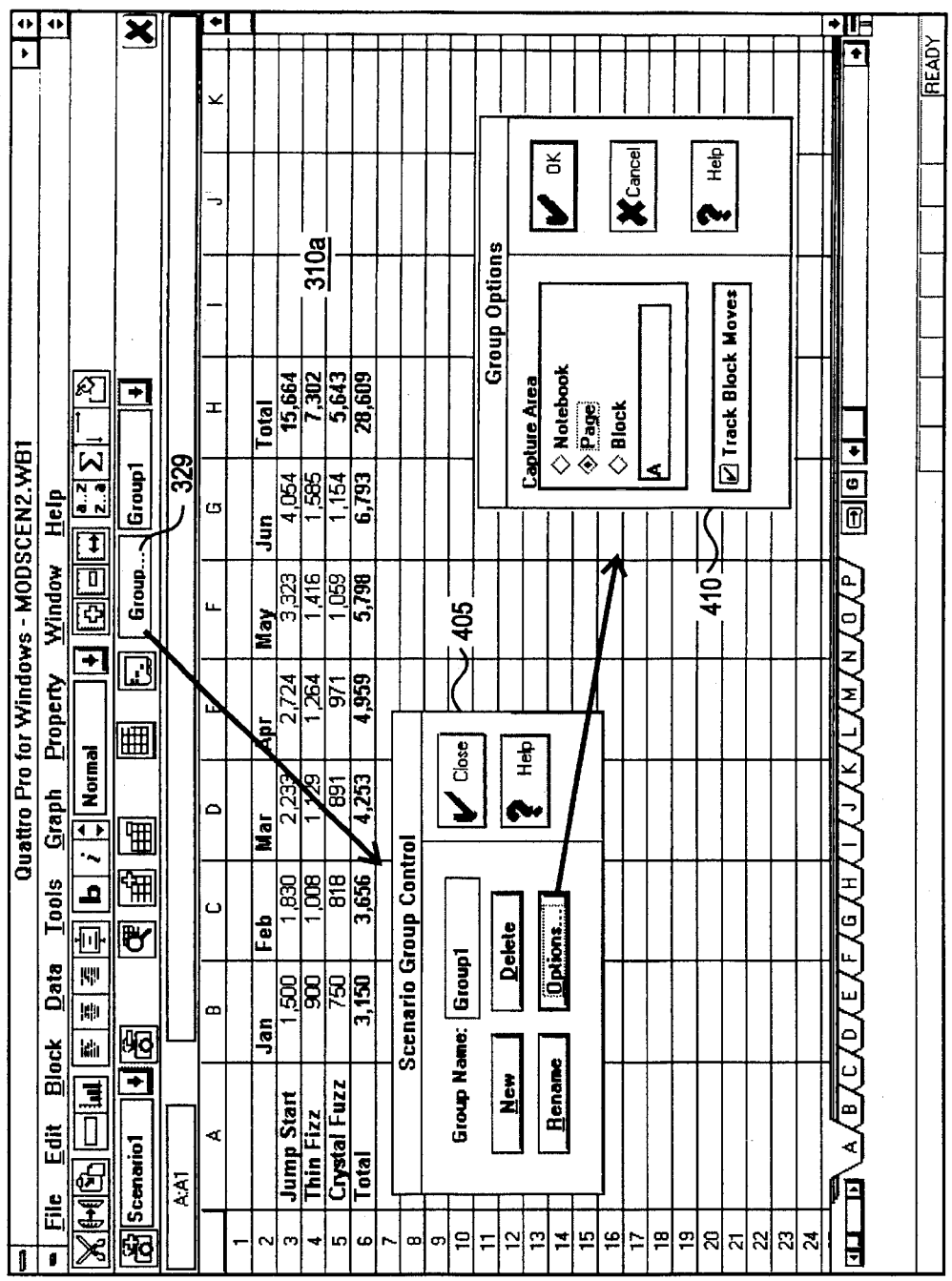

In FIG. 4A, the user has invoked the Manager (Tools: Scenario Manager) for the spread 310 (from FIG. 3A). The Scenario Manager toolbar 320 is displayed. Next, the user sets a "capture area" by invoking the Group button 329. The capture area defines a set of information cells in which the Scenario Manager will track all changes (including determining changing cells and result cells). For instance, through dialogues 405, 410, the user may specify that the capture area is to be set to Page, that is, tracking changes in the active page (A). As a Page capture area is suitable for most purposes, it is the default capture area in the preferred embodiment. Alternatively, the user may select a capture area of Motebook to track changes within an entire notebook, or Block to track changes in a specified block. One should preferably only set Capture Area to Notebook if he or she is interested in tracking changing and result cells across several pages and does not intend to use the notebook for anything else but storing related scenarios. For a block capture area, the specified block can be contiguous or noncontiguous, 2-D or 3-D. Block is often the best Capture Area setting for scenarios based on existing data. If a user is entering new data and formulas for the scenario, Page is usually adequate.

(b) Scenario baseline

The Scenario Manager tracks changes against a baseline or base version. The base, which serves as a reference against which various scenarios may be compared, is typically the same as one's normal (unaltered) spreadsheet model. Before various edits, assumptions, and the like are applied to the base model, the user simply instructs the system to capture the baseline. If a user is working with an empty notebook, on the other hand, he or she can enter any labels and formulas before setting the baseline.

To set the baseline, the base model is captured by the user invoking the Capture Scenario button 321. One can think of it as a camera that is taking a snapshot of the current data model. An exemplary embodiment responds with a Capture Scenario dialog box displays where the user can name the captured scenario; a default baseline name of <Base Case> is provided for the first version captured. The user may enter any desired name in the Scenario Name edit field. From this point on, the system tracks all changes within the capture area.

(c) Identifying scenario cells

After the user has set the baseline, he or she proceeds to identify changing cells, either implicitly (automatically) or explicitly (manually). For automatic identification, the user simply enters new values into the cell(s) he or she desires to become changing cells. The user can easily specify that, say, cell B3 is the changing cell for spread 310 by changing the value for the cell (e.g., from $1,500 to $2,000) as shown in FIG. 4B.

Upon invocation of the Identify Scenario button 324, the system identifies the current scenario, that is, compares the data of the instant case with that of the base version; any cells which change from the user's entries are automatically identified. Specifically, differences in values for non-formula cells are identified and flagged as changing cells; this is accomplished by comparing each non-formula cell against its corresponding cell in the base case. Moreover, any cells which changed as a result of changes in changing cells are identified and flagged as result cells. This is accomplished by determining from formula cells those which express a changed value as a result of changes to the changing cell(s), that is, cells which directly or indirectly reference (e.g., through formulas) the changing cell(s).

Alternatively, the user may manually identify changing cell. In an exemplary embodiment, the user selects one or more cells desired to be changing cells and invokes the Add Changing Cell button 321. Then, the user enters any desired values into the designated cells. Result cells are automatically determined.

Figure 4B:
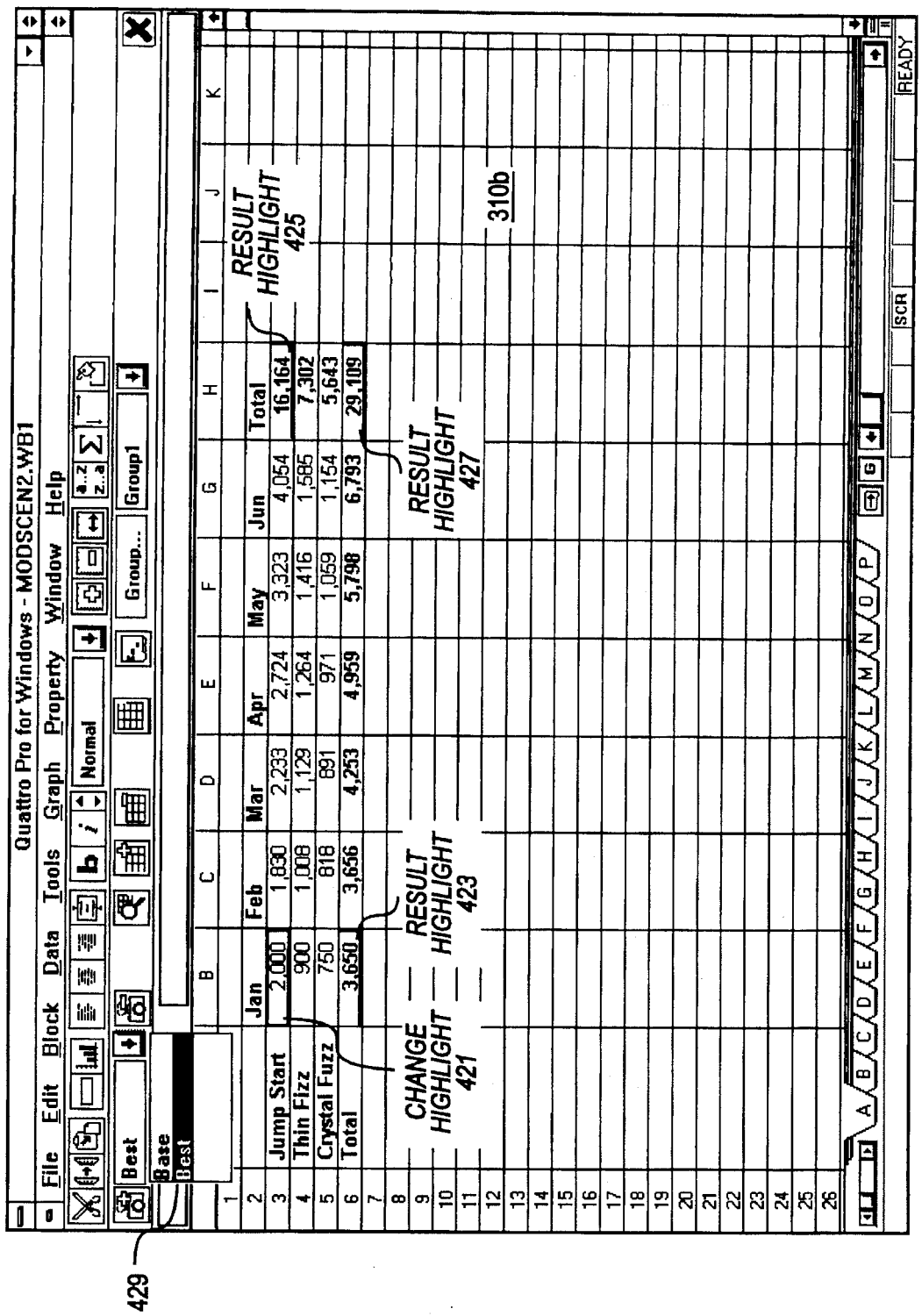

As shown in FIG. 4B, changing cells and result cells are specifically indicated to the user, for example with color highlight or other feedback. For the instant example, the changing cell B3 is highlighted with a change highlight 421. Resulting cells B6, H3, and H6—the resulting cells—are highlighted with result highlights 423, 425, 427, respectively. By default on color monitors, changing cells are shaded yellow, and the result cells are green; these may be changed to user-specified colors. Moreover, by selecting the Toggle Highlights button 327, the user may instruct the system to switch cell highlighting on and off as desired. The user may also want to focus on fewer changing cells than the system has shaded, for instance, to exclude unwanted cells (i.e., from unnecessary highlighting); this is accomplished by selecting the cells and invoking the Remove Changing Cell button 326.

The user may interactively edit the instant version until a desired scenario is achieved. When the user is satisfied with the scenario cells and values, the user invokes the Capture Scenario button 321 to capture the instant version as a new scenario. The user provides the new scenario with a descriptive name in the Scenario Name edit field. In the example at hand, sales of Jump Start of $2,000 in January (i.e., 25% increase over the base case) represents the "Best" case scenario. Thus, this version is aptly named "Best" 429 to indicate. Upon confirmation (e.g., selecting OK) by the user, the instant scenario is placed into the active group. When a user saves a scenario, the new values and shading of cells are included stored (as described in further detail below). One may continue adding or deleting scenarios to a desired group in this manner until he or she has achieved the desired scenario model.

Figure 4C:
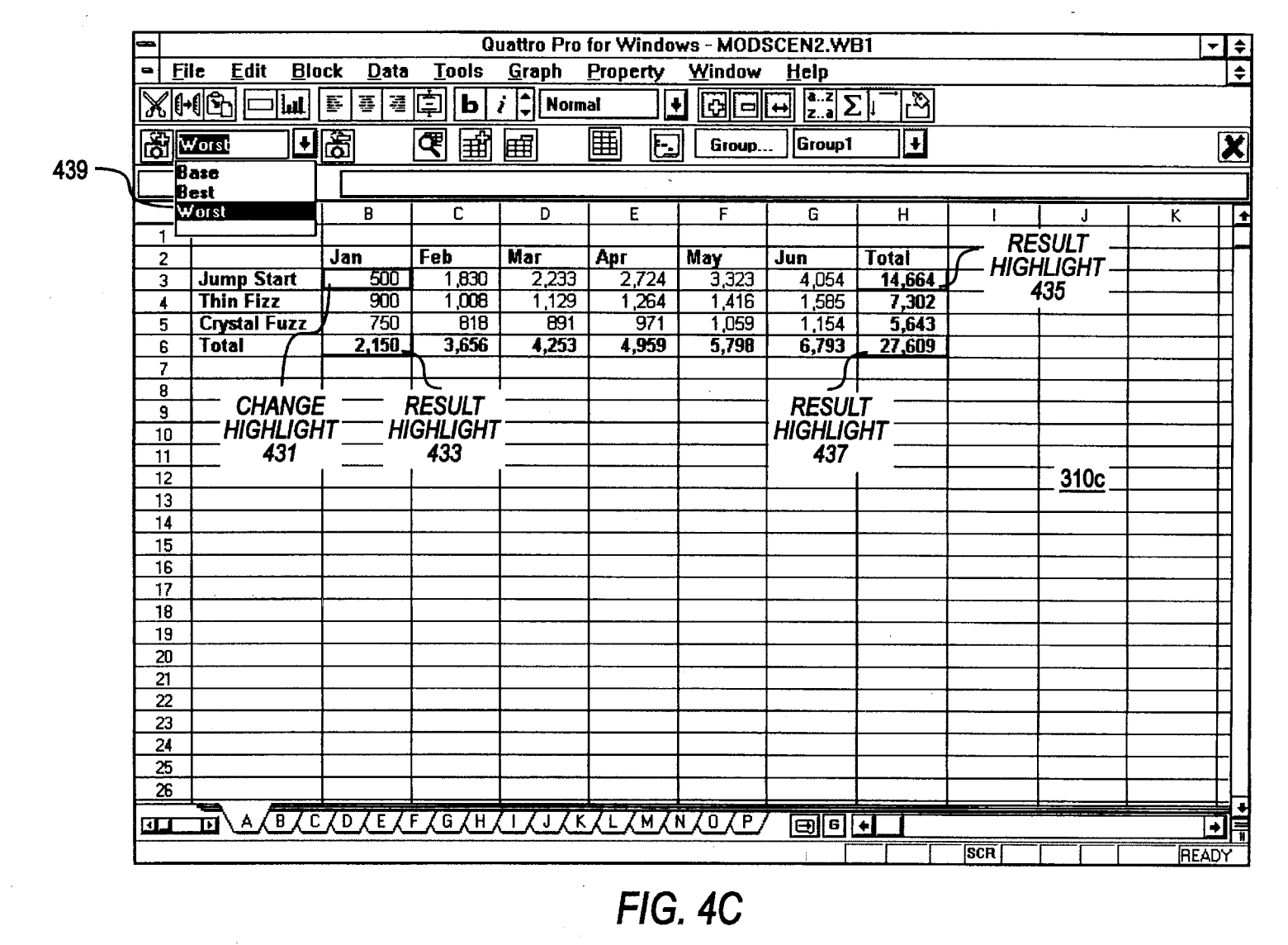

Referring now to FIGS. 4C–F, the creation and capture of additional scenarios for the present example will be described. In FIG. 4C, the user has changed the value of cell B3 to 500 (from its base value of 1,500). This represents the user's worst case scenario (i.e., for sales of Jump Start beverage for the month of January). The user invokes the Identify Scenario button 324 to identify this worst case. Upon invocation of Identify Scenario, the system performs the previously-described determination of changing and result cells. As shown by the spreadsheet page 310C, for instance, the change of January cells for Jump start to five hundred dollars will result in the system (automatically) determining that cell B3 is a changing cell; it is highlighted with change highlight 431. Likewise, cells B6, H3, and H6 are determined to be resulting cells, and they are indicated to the user with result highlight 433, 435, 437, respectively. If satisfied with this new scenario, the user may proceed to add (capture) it to the current group (e.g., with the descriptive title of "Worst" 439).

Figure 4D:
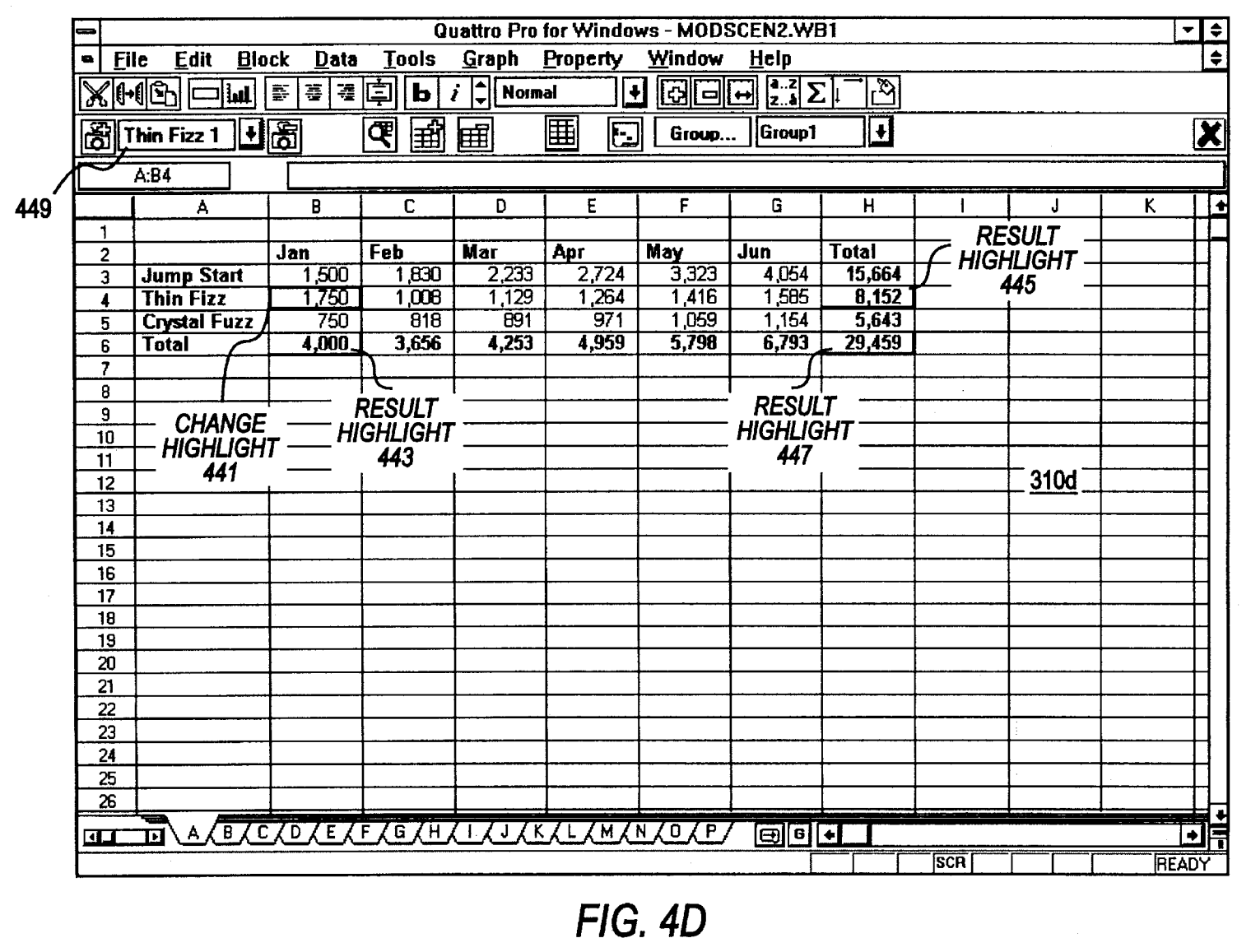

The changes in FIGS. 4B and C (310b, 310c) have, for purposes of simplification, been limited to a single set of cells. However, scenarios for the spreadsheet 310 are by no means constrained or limited to just a certain set of cells. As shown in FIG. 4D, for instance, the user may enter the value of 1,750 into cell B4, thus creating yet another scenario, named as Thin Fizz 1 (shown by title 449) by the user. When the system is instructed to identify the scenario, cell B4 is identified as a changing cell (recall that the January base value for Thin Fizz was 900); the cell is highlighted with change highlight 441. Cell B6, H4, and H6 are automatically determined by the system to be resulting cells; i.e., ones which depend, directly or indirectly, on cell B4. These cells are highlighted with result highlight 443, 445, and 447, respectively.

Figure 4E:
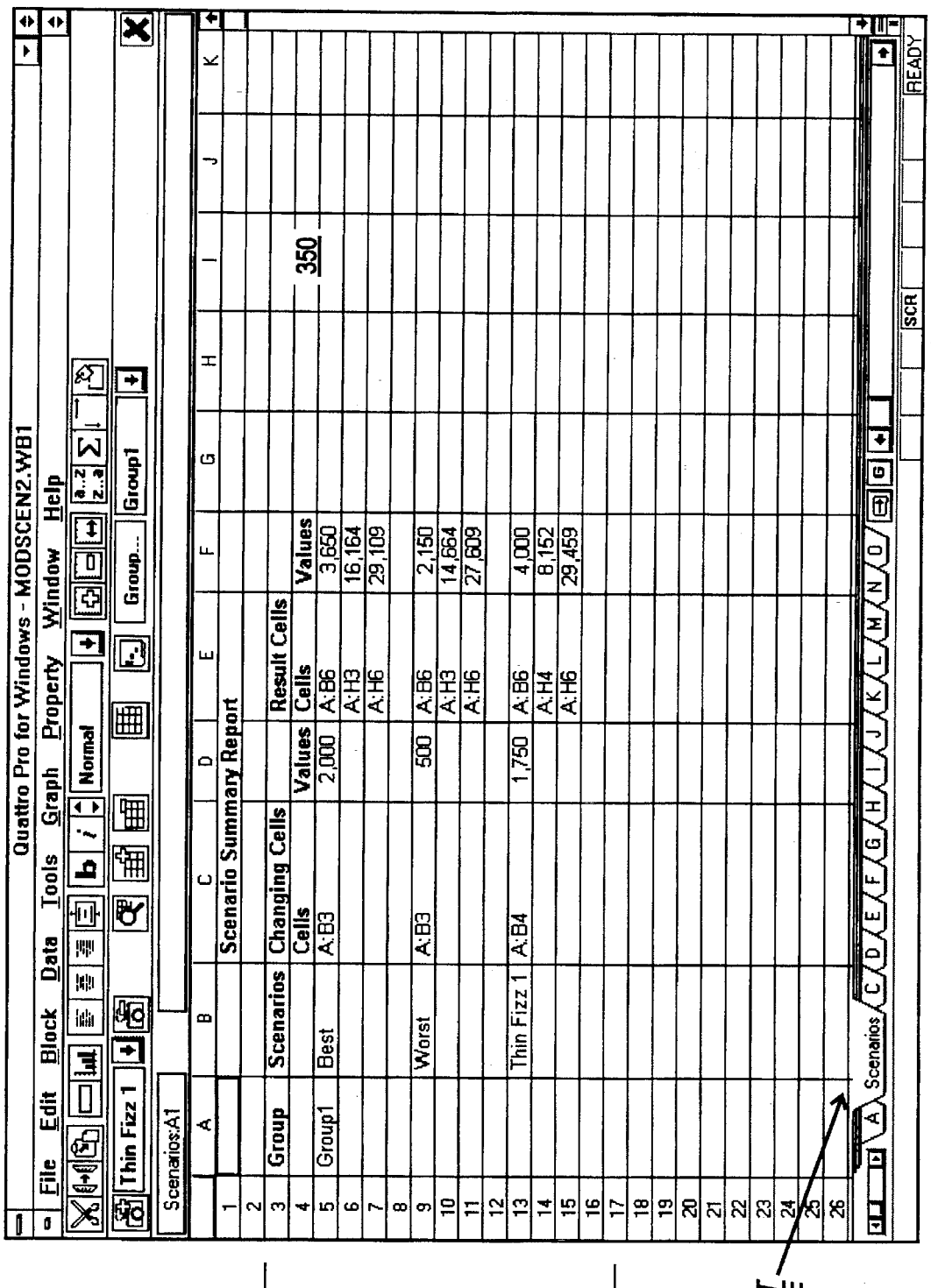
FIG. 4E is a bitmap screenshot illustrating a Scenario Summary Report provided by the system of the present invention.

By selecting Reports button 328 (from the manager toolbar 320), the user may automatically generate a report summarizing the scenarios which describe the instant scenario model. As shown in FIG. 4E, for instance, the aforementioned scenarios are summarized by a Scenario Summary Report 350. The report shows, for example, that the changing cell for the Best scenario is A:B3, which receives a new value of 2000. Result cells for the Best scenario are reported as: A:B6 receiving a new value of 3,650; A:H3 receiving a new value of 16,164; and A:H6 receiving a new value of 29,109. Corresponding changing and result cell values for the Worst and Thin Fizz 1 scenarios are reported as shown. By default, the Scenario Summary Report appears on the first empty page in the notebook, giving the user instant access to a report fully describing each scenario or version which comprises the model. To place it somewhere else, the user disables a Find Empty Page option and provides a destination (page and block).

Figure 4F:
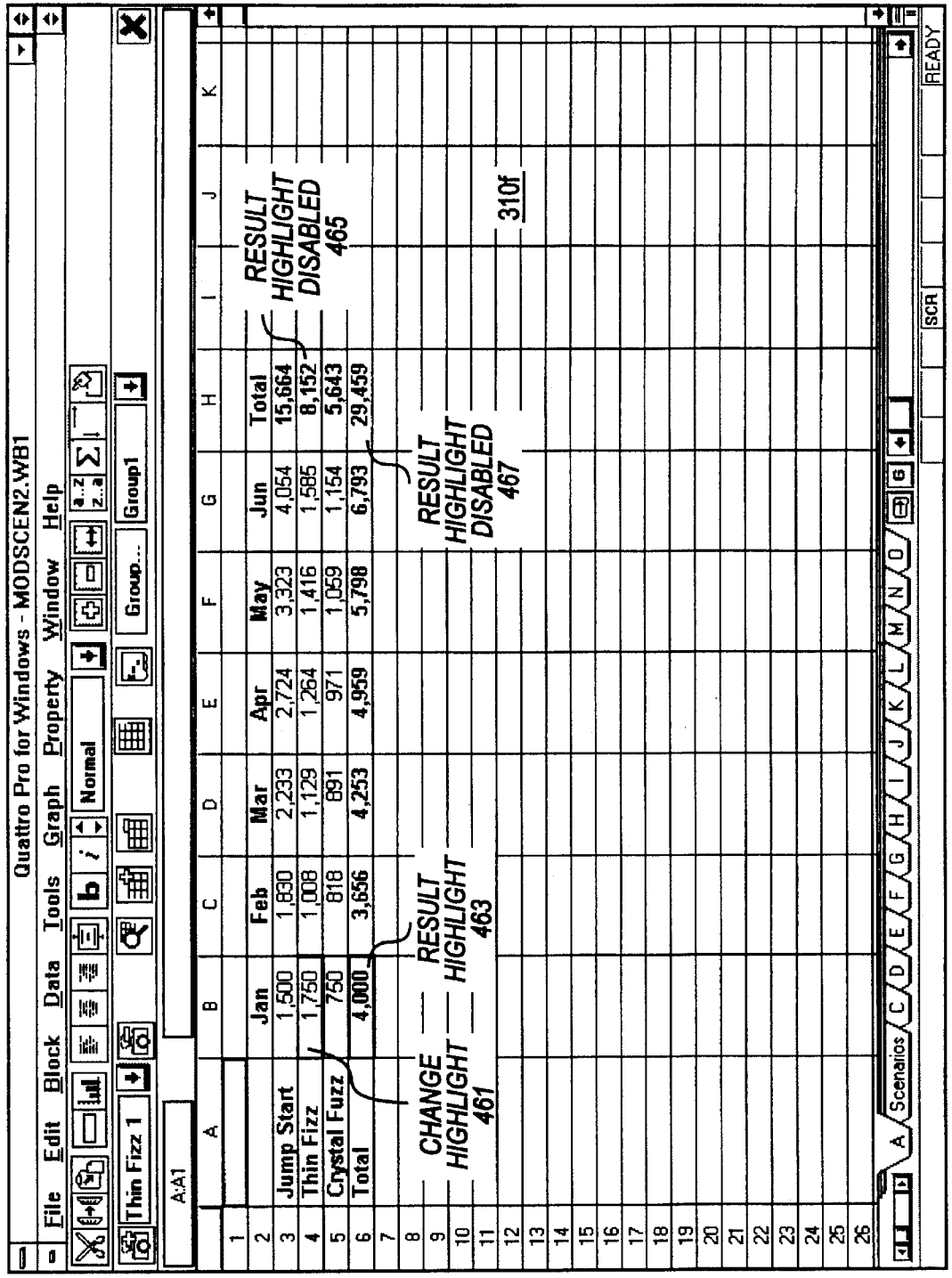
FIG. 4F is a bitmap screenshot illustrating the version of FIG. 4D with cell highlighting selectively disabled.

The foregoing scenario example employs a relatively simple spreadsheet model 310 so that the reader may focus on the teachings of the present invention (without distractions from a very complex spreadsheet model). In typical use, however, one would construct a spreadsheet model employing scores or even hundreds of cells, with cell interdependencies numbering on the order of hundreds or thousands. In such an instance, it may be desirable to not highlight every changing and result cell—the user may want to focus on fewer cells than the system has highlighted or shaded. To exclude unwanted cells (i.e., unwanted from highlighting), the user selects the desired cells and invokes the Remove (Changing/Result) Cell button 326; the system, in turn, will disable highlighting for these cells. As shown in FIG. 4F, for the Thin Fizz 1 scenario (of FIG. 4D), the user disables highlights for cells H4 and H6. As shown by the spreadsheet page 310F, cell B4 includes change highlight 461, and cell B6 includes result highlight 463. For the cells H4 and H6, however, result highlight is disabled (shown at 465, 467, respectively). In this manner, the user may apply the present invention to create sophisticated scenarios from complex spreadsheet models, yet the user may tailor system feedback to his or her preferences.

4. Scenario groups

A group comprises a set of scenarios. The foregoing example has illustrated the creation of a set of scenarios within a single group (Group1). Each notebook can have as many scenario groups as a user needs. To create or rename a group, the user invokes the Group button (previously described) for defining additional groups. To add a new group, one enters the name in the edit field and selects the Add button. When a user creates a new group, the first scenario he or she captures will be the baseline. To rename the active group, one enters a new name and selects Rename. To delete the current group and all scenarios in it, one selects Delete. The user can invoke the Options command to change the capture area or block tracking setting.

5. Displaying and editing scenarios

To display a desired scenario, the user need only select its name from the Scenario Name list. If the user has several scenario groups, he or she can select the target group in the Group Name list before selecting the scenario. When one displays a scenario, its changing cell and result cell values replace those currently displayed onscreen. In this manner, the user has instant access to the many versions captured for a base model.

The user can change the contents of any cell with standard editing procedures. To save edits to the active scenario, one invokes the Capture Scenario button. When the Capture Scenario dialog box appears, one keeps the same name to replace the active scenario with current cells and values. The user can enter another name to replace an existing scenario or create a new one, then confirm (select OK) to accept the scenario name. Any edits immediately appear in the Scenarios page.

6. Deleting scenarios and groups

To remove a scenario from the Scenario Name list and Scenarios page, the user selects it in the Scenario Name list and invokes the Delete Scenario button. If it is in another scenario group, one would select the Scenario Group button and select the group name first. To delete all scenarios in a group, one would first select the Scenario Group button. Then, one would select the group in the Group Name list. Finally, he or she would select Delete.

Internal operation

Figure 5A:
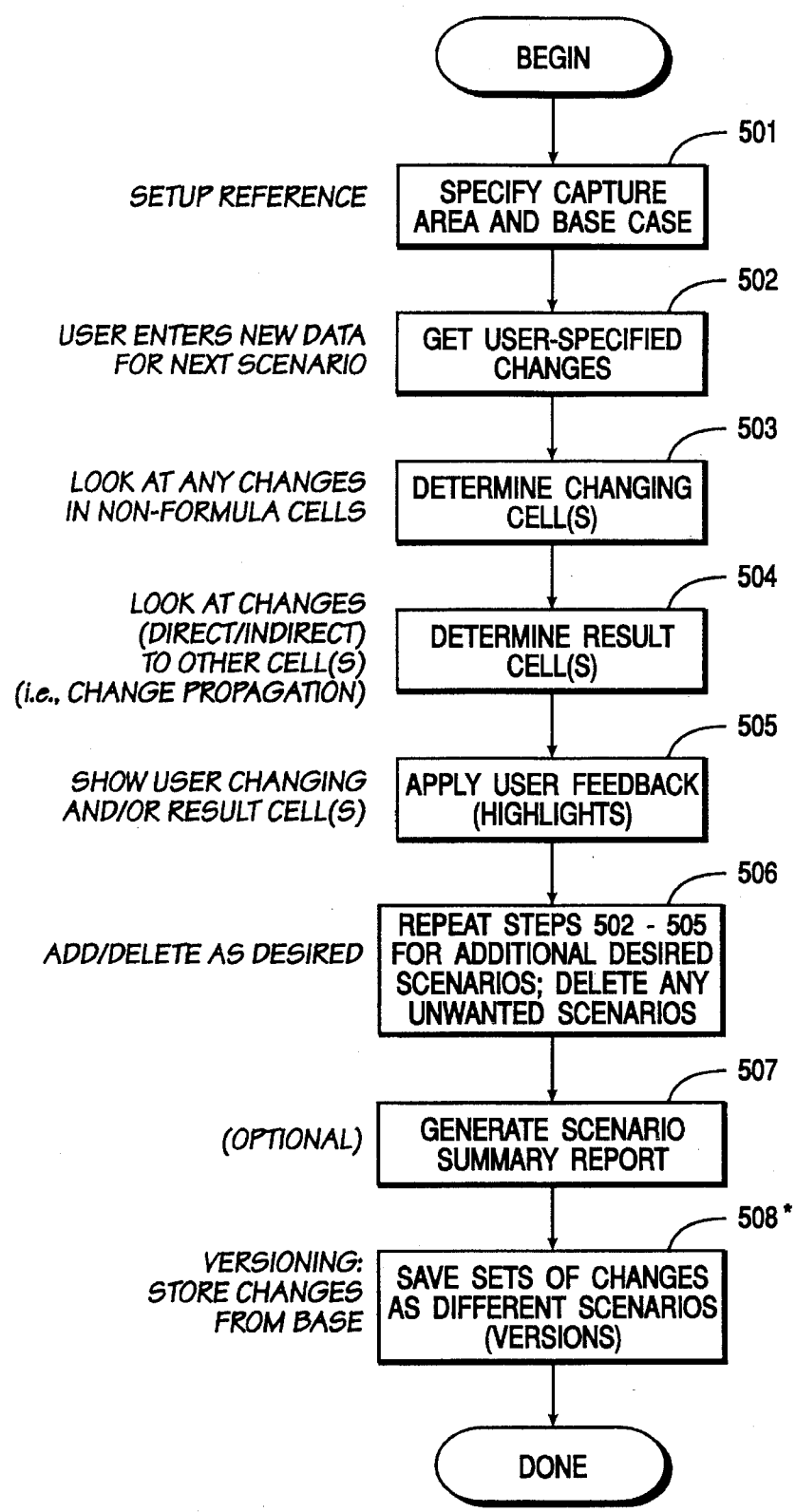
FIG. 5A is a flowchart of a scenario management method of the present invention.

The method of the present invention for scenario management is summarized by a flowchart 500 of FIG. 5A. The steps are as follows. At step 501, the user specifies a capture area, that is, an area in which the system will track user-specified changes. In a preferred embodiment, a capture area may be selected from a notebook, page, or block, with a default value of page. Alternatively, the system may automatically determine the capture area, for example, from a bounding box which includes all cells changed by the user. At step 502, user-specified changes are received. Here, the user edits desired cells (typically entering new cell values) for creating a new scenario. After concluding step 502 (e.g., by selecting the Identify Scenario command), the system determines changing cells at step 503. Here, the system compares the values of the current non-formula cells against corresponding ones of those cells from the parent capture area or "base case" (specified in step 501). At step 504, the system determines result cells by looking at cells (typically, formula-storing cells or "formula cells") which express a new result in response to changes in those cells identified as changing cells. At step 505, the system highlights the identified changing and result cells, thus providing visual feedback to the user. The user may selectively enable and/or disable such feedback for desired ones of the cells.

At the conclusion of step 505, the user has created a new scenario using the scenario management tools of the present invention. At step 506, steps 502–505 may be repeated for creating additional scenarios; any unwanted scenarios may be deleted (from the scenario list box). Upon the creation of all desired scenarios, the user may instruct the system to generate a scenario summary report at step 507, if desired. At step 508, the user saves the current notebook with the different scenarios (versions) being stored as changes from the parent or base.

Figure 5B:
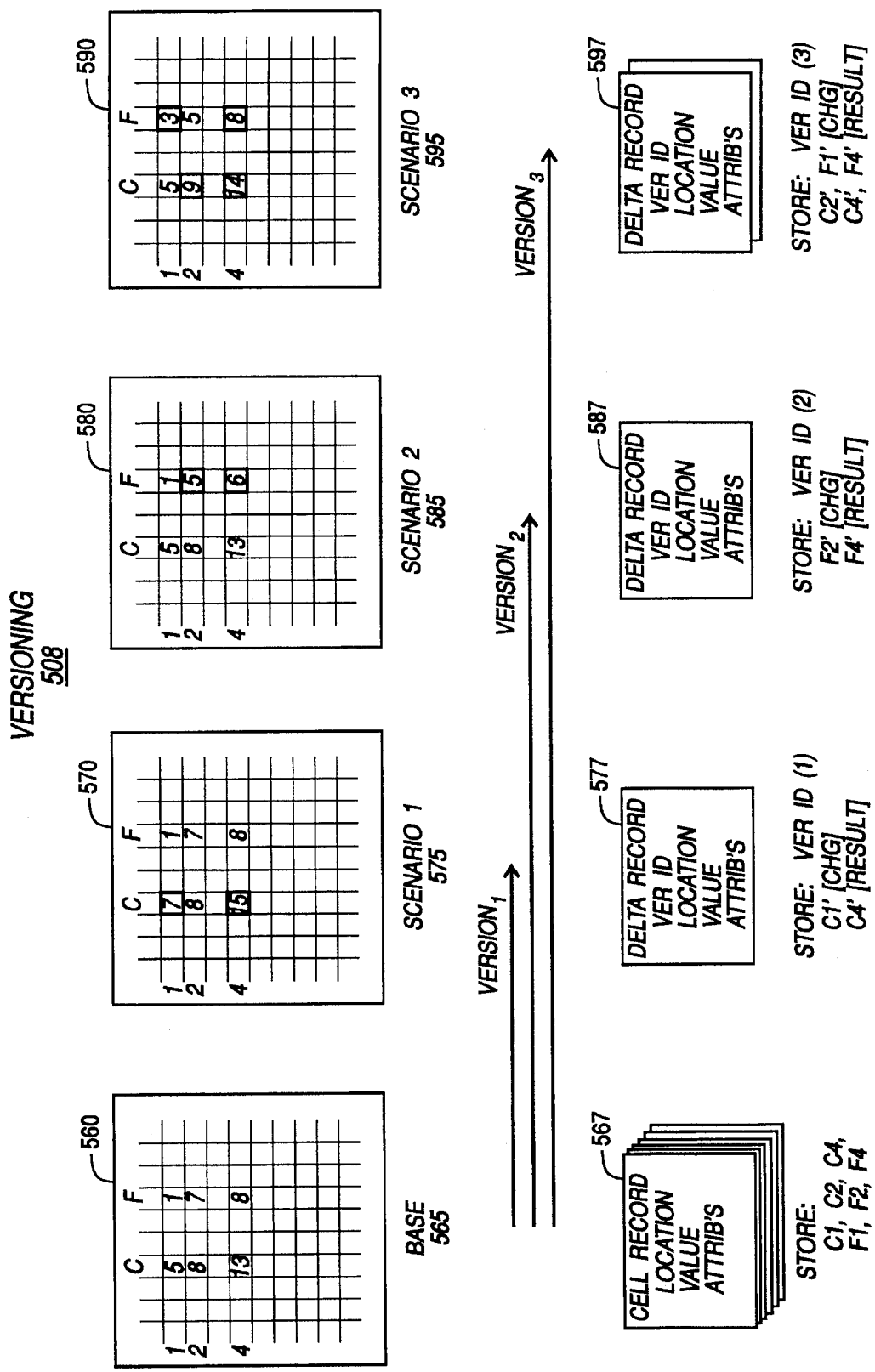
FIG. 5B is a block diagram illustrating a preferred method for maintaining (tracking and storing) cell information for new versions or scenarios.

Referring now to FIG. 5B, the versioning step 508 will be described in further detail. As shown by the figure, the different versions or scenarios represent incremental changes from the base. Suppose that spreadsheet model 560 is specified as a base 565. To support this base model, six cell records 567 are employed (for cells C1, C2, C4, F1, F2, F4). The present invention recognizes, however, that each additional version may be represented by just storing the difference (delta) record(s). The user may specify spread 570, for instance, as a first alternate version or scenario 575. As shown, there is one changing cell (C1) and one resulting cell (C4). To represent this new version, only a single difference (delta) record 577 need be created for storing the new information of C1 (C1') together with a version ID.

Continuing in this manner, spread 580 includes a different changing cell (F2) and a different result cell (F4), thus establishing a second scenario 585. The difference between this second version or scenario 585 from the base may be represented by a single delta record 587, which stores the new changing cell (F2') together with a different version ID. Finally, they were shown a third scenario 595, illustrated by spread 590, which includes two changing cells (C2 and F1), with two result cells. This third version may be represented internally by storing two delta or change records 597, which include cell information for the new cells (C2', F1') together with a version ID. The version IDs themselves may be stored within the individual records; alternatively, the scenario records may be clustered (e.g., into a predefined sequence of discrete groups) so that the ID for each record may be stored once for the group, or simply inferred from the relative position of the group. Those skilled in the art will appreciate that list structures (e.g., linked lists, trees, and the like) may also be employed to organize the scenario records, including relating them in a desired fashion to the base records.

While the invention is described in some detail with specific reference to a single preferred embodiment and certain alternatives, there is no intent to limit the invention to that particular embodiment or those specific alternatives. For instance, the versioning method of the present invention may be applied advantageously in those situations where it is desirable to manage multiple instances (versions) of a single model. Thus, the true scope of the present invention is not limited to any one of the foregoing exemplary embodiments but is instead defined by the following claims.

What is claimed is:

1. An electronic spreadsheet system for processing different versions of a spreadsheet model comprising:
   (a) a processor and a storage means;
   (b) means for maintaining a base version of said spreadsheet model as ordered information on said storage means, said ordered information including a first type of information that includes data values and a second type of information that depends on other portions of said ordered information;
   (c) means for creating a new version of said spreadsheet model in response to user input specifying modification of at least one portion of said ordered information;
   (d) comparison means for determining portions of said new version which have changed when compared against said base version, said comparison means being responsive to said at least one portion of said ordered information that changed in direct response to said user input, and further responsive to information of said second type that changed as a result of changes to said at least one portion of said ordered information; and
   (e) versioning means for maintaining said new version by storing additional information for only those portions determined to have changed.

2. The system of claim 1, wherein:
   said spreadsheet model maintains information in a plurality of information cells;
   said ordered information includes a first set of data records describing information cells of said base version; and
   said additional information includes a second set of data records describing information cells for only those portions of said new version determined to have changed.

3. The system of claim 2, wherein each data record of said second set which describes an information cell is a version record storing a changed value for its cell.

4. The system of claim 3, wherein each version record further includes a cell location.

5. The system of claim 2, further comprising:
   means for creating an additional new version of said spreadsheet model; and
   means for storing additional information for said additional new version as a subsequent subset of said second set of data records.

6. The system of claim 5, wherein:
   each data record of said second set which describes an information cell is a version record storing a changed value for its cell; and
   each version record further includes an identifier associating the record with a specific new version.

7. The system of claim 5, wherein:
   each data record of said second set which describes an information cell is a version record storing a changed value for its cell; and
   version records for each new version are stored so that a specific new version may be inferred.

8. The system of claim 7, wherein version records for a particular new version are grouped as a discrete subset so that the version may be inferred from the ordinal position of the subset relative to other subsets.

9. The system of claim 8, further comprising:
   means for grouping desired ones of the new versions into discrete subgroups, each said subgroup having a user-supplied group name.

10. The system of claim 9, further comprising:
    group selection means for selecting a desired one of said subgroups, whereby only those new versions within a selected subgroup are immediately available for display.

11. The system of claim 5, further comprising:
    means for associating each new version with a user-supplied descriptive label.

12. The system of claim 11, further comprising:
    means for displaying a list of all user-supplied descriptive labels;
    input means for selecting a desired version by choosing one of said user-supplied descriptive labels from said list; and
    means for displaying a version whose descriptive label has been selected with said input means.

13. The system of claim 12, wherein each said descriptive label includes textual information describing a version.

14. The system of claim 11, wherein said spreadsheet model maintains information in a plurality of information cells, and wherein said comparison means includes means for comparing each information cell of said new version against a corresponding information cell of said base version, whereby a difference in value between the two cells is identified as a change.

15. The system of claim 14 further comprising:
    user feedback means for automatically highlighting any changes between said new version and said base version.

16. The system of 15, wherein said user feedback means includes cell highlighting means for displaying with a screen highlight cells in said new version which have changed.

17. The system of claim 16, further comprising:
    means for selectively disabling cell highlighting for cells whose changes are not of interest to the user.

18. In an electronic spreadsheet system for modeling user-specified information in a data model comprising a plurality of information cells, a method for automatically identifying modifications to the data model by a user, the method comprising:

(a) specifying a reference set of information cells for the system to track user modifications against, said reference set of information cells including a first subset of information cells that store data and a second subset of information cells which directly or indirectly reference at least one information cell in said first subset;

(b) creating a new scenario of said data model in response to user input specifying modification of at least one of said information cells from said reference set, said new scenario having information cells corresponding to said information cells in said reference set, said new scenario including (i) said at least one of said information cells, so modified, and (ii) information cells in said second subset which directly or indirectly reference said at least one of said information cells;

(c) comparing information cells in said new scenario against corresponding information cells in said reference set; and (d) indicating to the user information cells in said new scenario which have changed when compared against corresponding ones in said reference set.

19. The method of claim 18, wherein step (d) includes:

highlighting any changes between said new scenario and said reference version.

20. The method of claim 19, wherein information cells modified by the user in step (b) are highlighted with a first screen color, and wherein information cells which directly or indirectly reference said information cells modified by the user are highlighted with a second screen color.

21. The method of claim 20, wherein said first screen color is yellow, and wherein said second screen color is green.

22. The method of claim 18, wherein step (b) includes entering new values into at least one of the information cells from said reference set.

23. The method of claim 18, wherein step (c) includes:

comparing non-formula information cells in said new scenario against corresponding ones in said reference set, whereby ones of said new scenario which have changed in value are identified as changing cells; and comparing formula information cells in the said scenario against corresponding ones in said reference set, whereby ones of said new scenario which have changed in value are identified as result cells.

24. The method of claim 18, wherein step (c) includes:

(i) comparing non-formula information cells in the new scenario against corresponding ones in the reference set, whereby ones of the new scenario which have changed in value are identified as changing cells; and (ii) of the information cells which are not changing cells, determining ones which change value as a result of the changes in the changing cells, whereby ones which have changed value are identified as result cells.

25. The method of claim 24, wherein each said result cell includes a direct or an indirect reference to at least one changing cell.

26. The method of claim 24, wherein the determination of result cells in substep (ii) is limited to examining only cells which store formulas.

27. In an electronic spreadsheet system for modeling user-specified information in a data model comprising a plurality of cells, a method for automatically identifying modifications to the data model by a user, the method comprising:

specifying a reference set of cells for the system to track user modifications against, said reference set of cells including a first subset of cells that store data and a second subset of cells which directly or indirectly reference at least one cell in said first subset;

creating a scenario of said data model by modifying at least one of said cells in said first subset of said reference set, said scenario having corresponding first and second subsets of cells corresponding to said first and second subsets of cells in said reference set;

comparing cells in said scenario against corresponding cells in said reference set;

indicating to the user cells in said first subset of said scenario that have been found to have changed when compared against corresponding cells in said first subset of cells in said reference set; and indicating to the user cells in said second subset of said scenario that have been found to have changed when compared against corresponding cells in said second subset of cells in said reference set.

28. The method of claim 27, wherein said indicating steps include:

displaying, with a first highlight color, cells in said first subset of said scenario that have been found to have changed when compared against corresponding cells in said first subset of cells in said reference set; and displaying, with a second highlight color, cells in said second subset of said scenario that have been found to have changed when compared against corresponding cells in said second subset of cells in said reference set.

29. In an electronic spreadsheet system for modeling user-specified information in a data model comprising a plurality of cells, a method for automatically identifying modifications to the data model by a user, the method comprising:

specifying a reference set of cells for the system to track user modifications against, said reference set of cells including a first subset of cells that store data and a second subset of cells which directly or indirectly reference at least one cell in said first subset;

creating a scenario of said data model by modifying at least one of said cells in said first subset of said reference set, said scenario having corresponding first and second subsets of cells corresponding to said first and second subsets of cells in said reference set;

comparing cells in said scenario against corresponding cells in said reference set; and in response to a request for a scenario summary report, (a) displaying a first list of cells in said first subset of said scenario that have been found to have changed when compared against corresponding cells in said first subset of cells in said reference set, and (b) displaying a second list of cells in said second subset of said scenario that have been found to have changed when compared against corresponding cells in said second subset of cells in said reference set.

30. The method of claim 29, and further comprising the steps of displaying the values of said cells in said first and second lists.

31. The method of claim 29 and further comprising the steps of:

creating an additional scenario of said data model by modifying at least one of said cells in said first set of said reference set, said additional scenario having corresponding first and second subsets of cells corresponding to said first and second subsets of cells in said reference set;

comparing cells in said additional scenario against corresponding cells in said reference set; and in response to said request for a scenario summary report, (c) displaying a third list of cells in said first subset of said additional scenario that have been found to have changed when compared against corresponding cells in said first subset of cells in said reference set, and (d) displaying a fourth list of cells in said second subset of said additional scenario that have been found to have changed when compared against corresponding cells in said second subset of cells in said reference set.

32. The method of claim 29, and further comprising thee steps of displaying the values of said cells in said third and fourth lists.

* * * * *